US012567537B2

(12) United States Patent
Meier et al.

(10) Patent No.: US 12,567,537 B2
(45) Date of Patent: Mar. 3, 2026

(54) INDUCTIVE POWER AND COMMUNICATIONS BUS

(71) Applicant: BITSTRATA SYSTEMS INC., Saskatoon (CA)

(72) Inventors: Ian Robert Meier, Saskatoon (CA); Michael David Lockerbie, Saskatoon (CA)

(73) Assignee: Bitstrata Systems Inc., Saskatoon (CA)

( * ) Notice: Subject to any disclaimer, the term of this patent is extended or adjusted under 35 U.S.C. 154(b) by 79 days.

(21) Appl. No.: 18/025,429

(22) PCT Filed: Sep. 8, 2021

(86) PCT No.: PCT/CA2021/051234
§ 371 (c)(1),
(2) Date: Mar. 9, 2023

(87) PCT Pub. No.: WO2022/051843
PCT Pub. Date: Mar. 17, 2022

(65) Prior Publication Data
US 2023/0326670 A1      Oct. 12, 2023

Related U.S. Application Data

(60) Provisional application No. 63/076,566, filed on Sep. 10, 2020.

(51) Int. Cl.
*H01F 38/14* (2006.01)
*H04B 5/26* (2024.01)

(52) U.S. Cl.
CPC ............... *H01F 38/14* (2013.01); *H04B 5/26* (2024.01); *H01F 2038/146* (2013.01)

(58) Field of Classification Search
CPC ...................................................... H02J 50/40
See application file for complete search history.

(56) References Cited

U.S. PATENT DOCUMENTS 3,400,468 A      9/1968   John
4,736,452 A *   4/1988   Daniels ................... H02J 50/40
                                                    336/212

(Continued)

FOREIGN PATENT DOCUMENTS

CA          2792256  A1      9/2011

OTHER PUBLICATIONS

International Search Report and Written Opinion of the International Searching Authority from International Patent Application No. PCT/CA2021/051234, Dated Nov. 26, 2021, 17 pages.

(Continued)

*Primary Examiner* — Daniel Kessie
(74) *Attorney, Agent, or Firm* — Lempia Summerfield Katz LLC

(57)              ABSTRACT

Systems and methods for providing power to and support bidirectional communications between one or more devices by injecting an alternating current into a primary conductive loop. The devices inductively couple to the loop to receive power, receive data, and transmit data. The coupling may occur at any position along the loop by passing one wire of the primary loop through the physical opening in a magnetic circuit.

16 Claims, 9 Drawing Sheets

(56) References Cited

U.S. PATENT DOCUMENTS

| | | | |
|---|---|---|---|
| 2004/0119340 A1* | 6/2004 | Nishino ................. | B60L 5/005 |
| | | | 307/31 |
| 2011/0241889 A1 | 10/2011 | Fromme et al. | |
| 2014/0152095 A1* | 6/2014 | Meysenc .................. | H02J 3/14 |
| | | | 307/17 |
| 2015/0214752 A1* | 7/2015 | Gluzman ............... | H02J 50/12 |
| | | | 307/104 |
| 2019/0156998 A1 | 5/2019 | Park et al. | |
| 2019/0265082 A1 | 8/2019 | Zafar et al. | |
| 2021/0105603 A1 | 4/2021 | Meier et al. | |
| 2021/0384765 A1* | 12/2021 | Das ........................ | H02J 50/12 |

OTHER PUBLICATIONS

International Preliminary Report on Patentability from International Patent Application No. PCT/CA2021/051234, dated Mar. 7, 2023, 6 pages.
Partial European Search Report from European Patent Application No. 21865419, dated Sep. 17, 2024, 13 pages.
Supplementary European Search Report for EP Application No. 21865419.2-1206 mailed on Feb. 5, 2025. (14 pages).

* cited by examiner

FIG. 9A
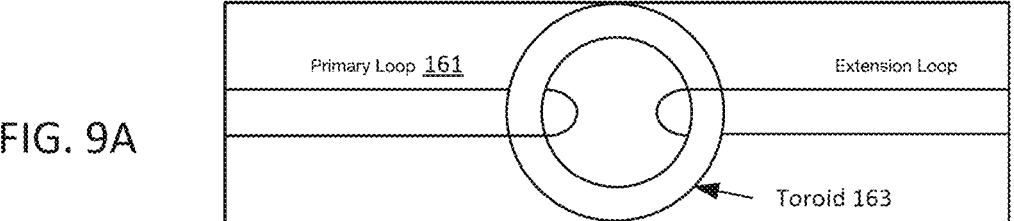
FIG. 9B
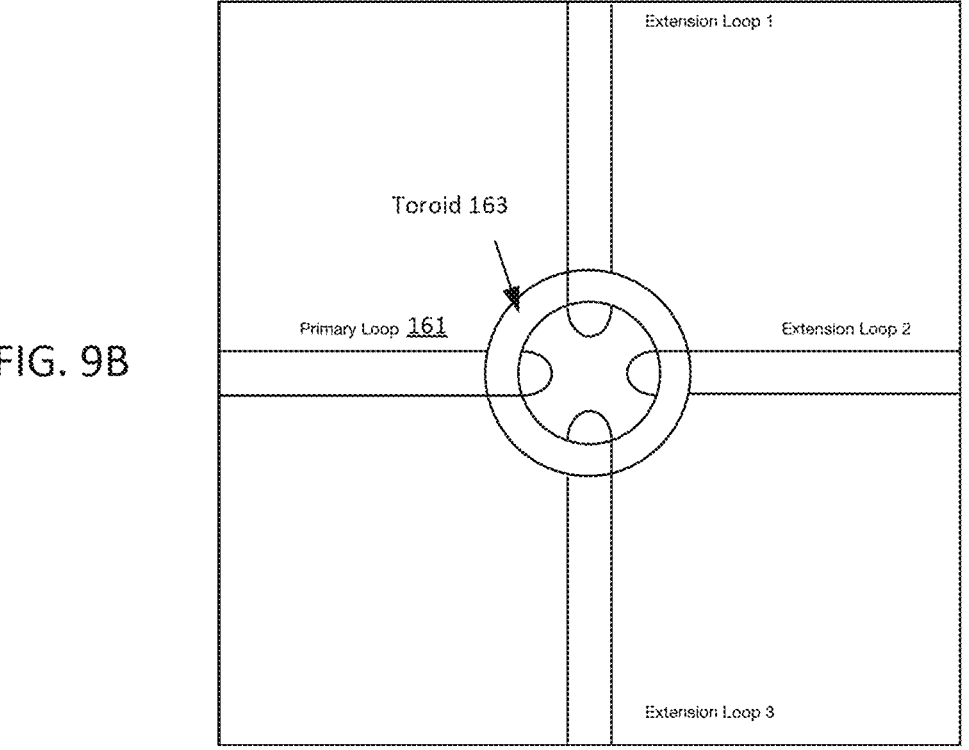
FIG. 9

INDUCTIVE POWER AND COMMUNICATIONS BUS

CROSS REFERENCE TO RELATED APPLICATIONS

This present patent document is a § 371 nationalization of PCT Application Serial Number PCT/CA2021/051234, filed Sep. 8, 2021, designating the United States, which is hereby incorporated in its entirety by reference. This application also claims the benefit of the filing date of U.S. Provisional Application Ser. No. 63/076,566 filed on Sep. 10, 2020, the entire disclosure of which is incorporated by reference in its entirety.

FIELD

Embodiments relate to systems for inductive coupling to a current loop.

BACKGROUND

The use of a pair of electrical conductors as a transmission line is a highly reliable method for transmitting power and data between devices. Connection to conductors is typically done electrically, where the conductors of the device(s) and the transmission line are physically connected. A voltage source, such as a battery or generator, is connected across the two conductors and provides a voltage supply to any devices electrically connected across the conductors. If the voltage source is of low impedance, then the voltage will remain mainly constant under load, and an increase in power drawn by the attached devices will result in an increase in current flow through the transmission line and device; voltage-based power and data transmission delivers power at mainly constant voltage, and variations in power demand cause a corresponding change in current.

This is a very efficient method of coupling to the transmission line, but direct connection has reliability and safety implications. Adding branches to the wires for devices such as lighting or receptacles involves switching off circuits so they may be safely worked on. Further, adding extra wiring requires cutting and splicing wires, that is labor intensive and introduces failure points. Because bare conductors must be exposed for direct connection, this may present a safety hazard if the live conductor is touched. Further, the connections must be sealed for operation under harsh environmental conditions and wide temperature swings, increasing costs and introducing failure points, and ground fault interrupters must be employed in wet areas to ensure human safety in case of a single fault between a live conductor and ground.

Wireless communication systems help to overcome the challenges for data transmission, at decreased reliability, but still requires a separate power source that is often wired. Battery power is also common but comes at increased maintenance costs. Energy harvesting techniques may be utilized in certain applications, but many devices cannot be powered using these methods. The state of the art of wireless power transmission is currently limited in the amount of power that may be transferred and distance over which power may be wirelessly transmitted and is currently being implemented by using charging pads that must be proximately located next to, such as with their housings in physical contact, the device to be powered. The pads and the device to be charged have an integrated coils and charge through the air. However, this approach is expensive and not practical for transmitting higher amounts of power, as the mutual inductance between two coils is very low without a low reluctance magnetic path coupling the circuits. A transformer provides efficient coupling between coils by providing such a low reluctance path, but typically requires direct electrical connection to the primary and secondaries. What is needed is a technology that allows for contactless power and data transmission between devices.

BRIEF SUMMARY AND DESCRIPTION

Embodiments provide a system for providing power and bidirectional communication including a conductive loop, one or more nodes, and a controller. The one or more nodes are configured to inductively couple with the conductive loop to receive power therefrom and conduct bidirectional communications thereover, wherein the coupling is possible at any unoccupied position along the conductive loop by passing a wire of the conductive loop through current transformer of a respective node. The controller is configured to inject alternating current into the conductive loop that is inductively coupled to each node, where the alternating current is received and converted to a working voltage by each respective node of the one or more nodes, the controller further configured to communicate data through the conductive loop with the one or more nodes.

Embodiments provide a system for monitoring a grain bin including a conductive loop, one or more sensors, and a controller. The conductive loop comprises a wire rope installed in the grain bin. The one or more sensors are inductively coupled to the conductive loop and configured to receive power, receive data, and transmit sensor data though the conductive loop. The controller is configured for communicating with the one or more sensors through the conductive loop to retrieve grain characteristics data for the grain bin, store the grain characteristics data in a memory, and transmit the grain characteristics data, via a communications interface, to other systems so a farmers may monitor a status of the grain bin.

Embodiments further provide a system for providing power and bidirectional communication including a primary loop, an extension loop, a ferromagnetic toroid, a plurality of nodes, and a controller. The primary loop is configured to provide power and bidirectional communications. The extension loop is configured to provide power and bidirectional communications. The ferromagnetic toroid is configured to couple the primary loop and the extension loop. The plurality of nodes is each coupled to either the primary loop or the extension loop by a current transformer embedded in each respective node. The controller is coupled to the primary loop and configured to communicate with and provide power to each of the plurality of nodes though the primary loop or the primary loop and the extension loop.

BRIEF DESCRIPTION OF THE FIGURES

FIGS. 9A and 9B depict examples of a toroid configured to couple a primary loop and one or more extension loops according to an embodiment.

DETAILED DESCRIPTION

Figure 1:
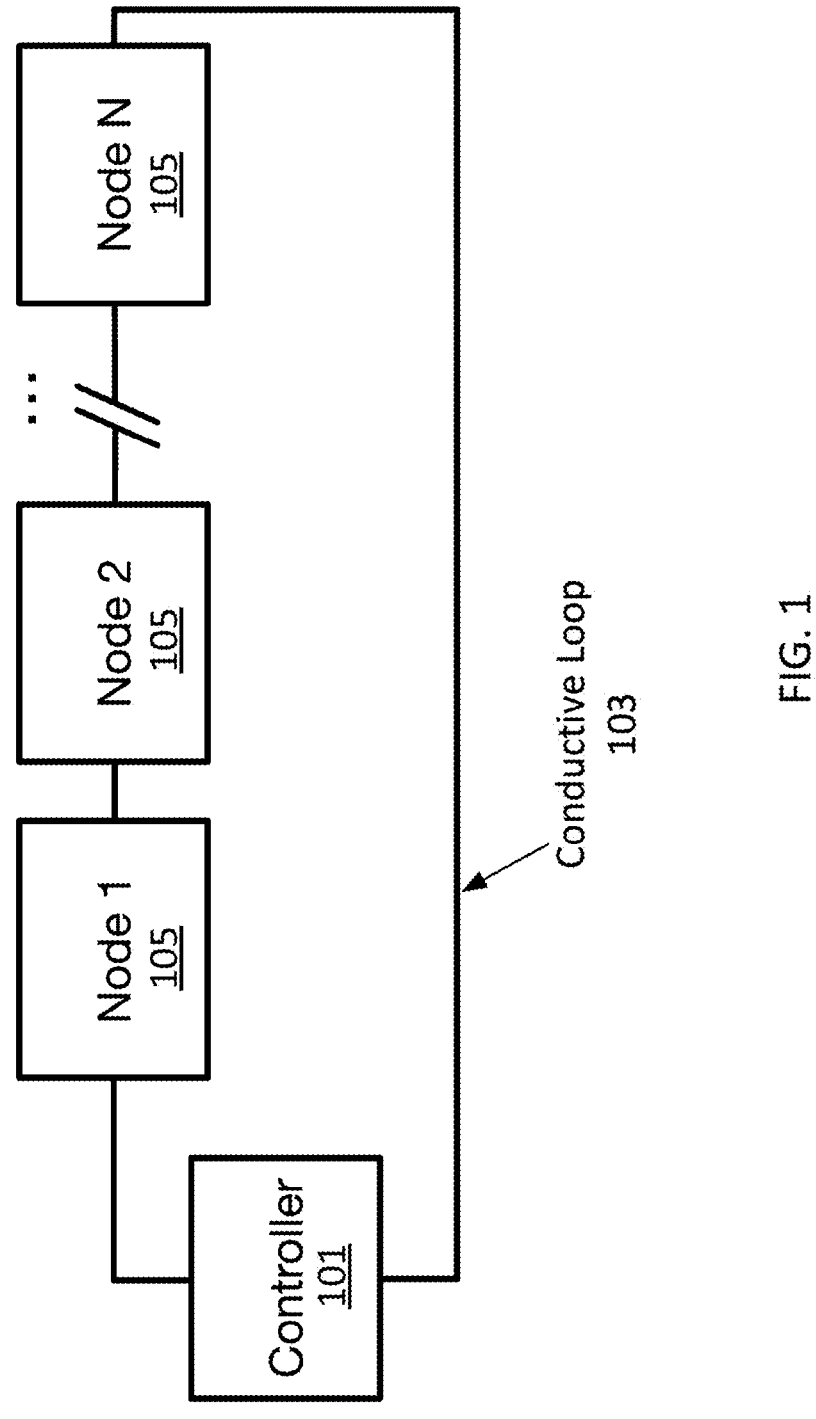
FIG. 1 depicts an example inductive power and communications bus according to an embodiment.

Embodiments provide systems for inductive coupling to a current loop to overcome connection challenges and functions as a hybrid wired-wireless system. Rather than connecting a voltage source to a pair of wires, a current source is connected to a single conductor looped back on itself or uses a return through a different conductor such as a steel frame, steel building, water system, or the earth. This causes a current to flow in the loop, with voltage sufficient to cause the current to flow at the desired rate. If this is an alternating current of sufficiently high frequency, such as 20 kHz to 200 kHz, the conductor may be threaded as a single pass through the primary of a current transformer. Lower frequencies may be used provided the current transformer is physically large enough. A current transformer is a specific type of transformer that may be constructed as an inductive coil wrapped around a ferromagnetic toroid, where the hole in the toroid is exposed. The toroid functions as a closed magnetic circuit, so that any induced magnetic field may flow with low magnetic reluctance. If a conductor is threaded through the hole of the toroid and carries an alternating current, it functions as a single-turn primary and will induce a magnetic flux in the toroid, inducing a voltage in the secondary coil wound around the toroid. This may be used as a current source to power and communicate with an external device. Inductive coupling requires no physical electrical connection, so it may be completely and permanently sealed to remain electrically safe and impervious to contamination and other environmental risks. The conductor may be energized by connecting an alternating current source across the ends of the wire, or by exciting the secondary of another current transformer and joining the ends of the conductor together as a loop either directly or through a voltage source. If the current source is high impedance, the current will remain mainly constant and increases in power drawn by devices will result in an increase in voltage across the device and current source; current-based power transmission delivers power at mainly constant current and variations in power demand cause a corresponding change in voltage.

The result is a simple power and data communications bus where each node is wirelessly coupled both for power and data transmission, avoiding the expense and failure mechanisms associated with electrical connectors and avoiding the unreliability of wireless communication via electromagnetic radiation. If the conductor is also coated with an insulator, the system may be entirely environmentally sealed, e.g., waterproof, and may even operate under water. The conductor may be any conductive material, such as copper, aluminum, or steel. Of these metals, copper may be the best conductor, followed by aluminum then steel. However, insulated steel wire rope provides excellent strength at a low cost, so it may be suitable for applications where large mechanical stresses may be imparted on the cable.

FIG. 1 depicts an example of a topology of a system for inductive power and communications, where a conductive loop 103 is driven directly by a controller 101, and each node 105 (device) is coupled to the loop 103 by a current transformer embedded in each node 105. The loop 103 threads through each node without making electrical contact. Wirelessly sending power and data typically involves two multi-turn flat coils, positioned such that one is on top of the other. By instead threading a cable through multiple current transformers, embodiments provide for arbitrary positioning of the node along the cable rather than having dedicated coils positioned at a fixed location. This also reduces the labor to install systems. Rather than running cables to sensors and terminating wires for connection to the sensors, the installer simply threads the cable through each sensor node with no need for terminations.

In order for the controller 101 to power each node, the controller 101 must inject alternating current into the loop 103. The signal may be any periodic signal, though sinusoidal or square waves may be preferred. This signal is then inductively coupled to each node, where it is received and then converted to a working voltage, typically direct current (D/C), through rectification techniques, including but not limited to half bridge rectification, center-tapped transformer rectification, full bridge rectification, or voltage multipliers. This voltage may then be used to power the node to perform the function for which the node is configured for.

Figure 2:
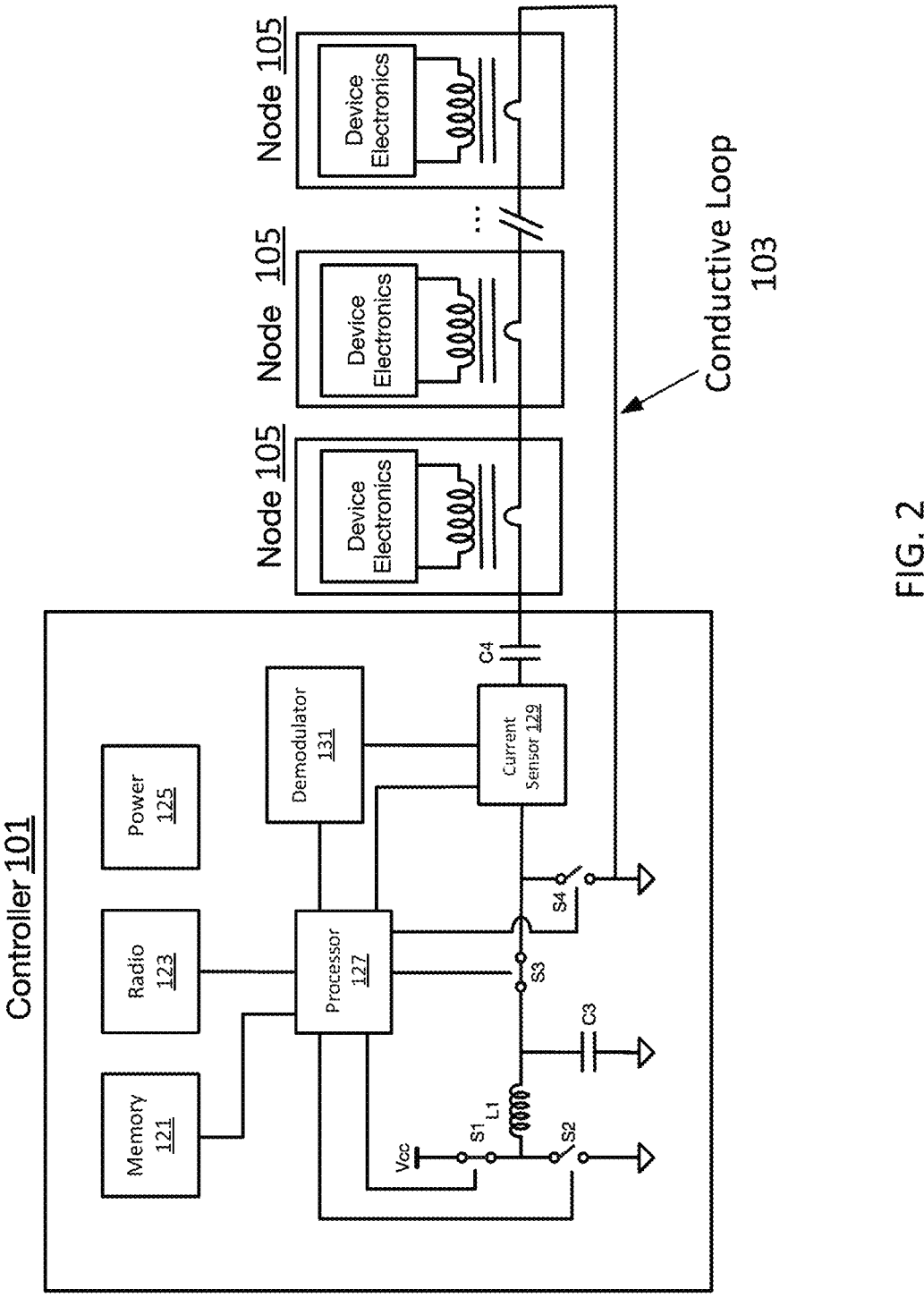
FIG. 2 is an example implementation of a controller of FIG. 1 according to an embodiment.

FIG. 2 is an example implementation of a controller 101, according to the disclosed embodiments, that may generate a square wave carrier at various voltages and frequencies and may measure the current in the loop 103 for the purposes of regulating to a particular current and for demodulating the signals transmitted from the nodes 105. The controller 101 includes a processor 127, flash storage/memory 121, a radio 123, a power supply 125, a demodulator 131, a current sensor 129, and one or more switches S1-S4. Additional components may be provided. The controller 101 provides power and bidirectional communications to the nodes 105 using the conductive loop 103.

The processor 127 may be a general processor, central processing unit, control processor, graphics processing unit, digital signal processor, three-dimensional rendering processor, image processor, application specific integrated circuit, field programmable gate array, digital circuit, analog circuit, combinations thereof, or other now known or later developed device for processing data.

The flash storage/memory 121 may be a volatile memory or a non-volatile memory. The memory may include one or more of a read-only memory (ROM), random access memory (RAM), a flash memory, an electronic erasable program read only memory (EEPROM), or other type of memory. The memory 121 may be removable from the controller 101, such as a secure digital (SD) memory card.

The radio 123 may be configured to radio frequency communication (e.g., generate, transit, and receive radio signals) for any of the wireless networks described herein including, for example cellular networks, the family of protocols known as WIFI or IEEE 802.11, the family of protocols known as Bluetooth, or another protocol.

The switches S1 and S2 may be any electronically controlled switches, for example transistors, and function as a first-stage voltage chopper to chop the controller's power supply voltage between 0 V and Vcc, at a particular frequency and duty cycle. S1 and S2 are in complementary states, such that is S1 is open while S2 is closed and vice versa. L1 and C3 function to low pass filter this signal to generate a DC voltage that may be varied between 0 V and Vcc. The switching frequency is generally chosen to be different than the carrier frequency used on the line and may typically be chosen to be higher to minimize the sizes of L1 and C3. S3 and S4 are used in the same fashion as S1 and S2 as a second-stage chopper to chop the variable DC voltage at a particular frequency, where the frequency may be modulated to communicate information. High frequencies are more limited in transmission range but afford smaller current transformers. A frequency range from 10 kHz to 200 kHz allows for compact current transformers, though increased losses due to the skin effect may be noticeable at these frequencies. The phase and duty cycle may also be modulated for the same purpose, that may be used in combination with the frequency to increase the data bandwidth to devices. The processor 127 controls S1, S2, S3 and S4 so that these functions may be controlled via software.

The current sensor 129 may be used on either side of capacitor C4, where the capacitor serves to optionally A/C couple the signal on the main loop 103. A/C coupling may be chosen to minimize galvanic corrosion, that is typically exacerbated by D/C signals. The signal from the current sensor 129 is measured by the processor 127 so that it may control the duty cycle of the first stage chopper as a means to regulate the current to a consistent nominal operating current. The current sensor 129 is also connected to a demodulator 131, that demodulates the A/C current signal for receiving data transmitted from the nodes 105. This may be a coherent demodulator, an envelope detector, digital signal processing performed by the processor 127 or another processor, or any other form of demodulator. Other components may be connected to the processor 128, such as the memory, sensors, actuators, wired communication interfaces such as Ethernet, USB, RS-232, etc., or transceivers such as Bluetooth, Wi-Fi, satellite, or any other form of wireless communications.

Various networking protocols may be layered on top of the described physical layer. As the bus is shared across multiple nodes 105, each one may require an address or other unique identifier for facilitating direct or multicast/ broadcast communications. These addresses may be preconfigured, assigned during manufacture or provisioning (similar to Ethernet MAC addresses), or dynamically by the controller 101 (similar to Dynamic Host Configuration Protocol (DHCP) assignment of IP addresses) or self-assigned if the addresses space is sufficiently large to avoid address collisions (similar to universally unique identifiers). If multiple nodes 105 of the same type are installed on the same cable, it may be necessary to assign the addresses individually to avoid ambiguity as to which node 105 is which. This may be facilitated with a user input device on the node 105 such as a switch, accelerometer, gyroscope, capacitive sensor, or any other device that may be activated by a user. Alternatively, the nodes 105 may be installed and detected/ registered with the controller 101 one-by-one and the addresses assigned/registered as they are detected. For sensor data collection applications, the controller 101, in one embodiment, may poll (pull) each, or a subset, of the attached nodes 105 by energizing the line and polling each, or a particular, node 105 at a particular rate. This may be implemented by sending a read command to the desired node 105, and the node 105 may then respond in kind. After each device has been interrogated, the controller 101 may stop energizing the line to minimize power consumption, then repeat the process depending on bandwidth and power dissipation requirements. The controller 101 and/or nodes 105 may modulate the carrier signal, for example using various modulation techniques such as amplitude shift keying (ASK), frequency shift keying (FSK), phase shift keying (PSK) and others. The use of FSK for transmission from the controller 101 and ASK for transmission from nodes 105 allows the controller 101 to transmit and receive simultaneously. If multiple ASK frequencies are used, then multiple nodes 105 may transmit concurrently. However, if the nodes 105 all use the same ASK modulation frequency, then only one node 105 may transmit at a time without causing transmission errors. Even without the use of multiple ASK modulation frequencies, this may still allow for full-duplex communications between the controller 101 and a single node 105 at any given time. Alternatively, asynchronous communication (push) may be implemented that may avoid the need to register devices with the controller 101 and avoid delays associated with polling devices that, for example, have no data to report. If the application requires that nodes 105 be able to send data asynchronously instead of being polled, the bus may be energized to facilitate this communication. Because the nodes 105 may transmit at any time, this may require a collision detection mechanism to allow nodes 105 to cease transmission on the bus if a collision is detected. One way to provide that mechanism is to have the controller 101 acknowledge or echo the data transmitted by the node 105, either at a bit, byte, or packet level. Because the controller 101 and node 105 have a full-duplex connection, the node 105 may be immediately informed of a transmission error, and cease transmission for a randomly determined holdoff interval, where that interval may be partially controlled by the node's address. Messages may be organized into packets containing framing, payload and a CRC or other checksum mechanism. Framing may use reserved bytes and escape bytes, or by adding dedicated framing bits to the protocol. Both the controller 101 and the nodes 105 may implement an acknowledgement (ACK) or negative acknowledgement (NACK) mechanism to confirm or reject packets, respectively. This may be accommodated with specific packets, reserved bytes, or reserved bits. The use of ACK and NACK messages allow devices to confirm whether retransmission is required. Nodes 105 may be equipped to receive messages directly from other nodes 105 if they have the capability to demodulate the ASK signal. This potentially increases the cost of the nodes 105 but results in a communications bus where each node 105 may communicate directly with each other node 105. Without this capability, the controller 101 must bridge any such communication between nodes 105 at the expense of lower bus bandwidth. Note that the collision detection technique described, where the controller 101 echoes data sent by the nodes 105 at a bit or byte level, is a transparent form of bridging; data sent by a node 105 will cause the controller 101 to modulate the frequency of the carrier, and this may be detected by the node 105 transmitting the data, and any other node 105 on the bus. This allows for nodes 105 to communicate with each other nearly directly, but the bus effectively becomes half duplex or simplex, since only one device may communicate at once and the controller 101 cannot transmit its own data simultaneously as it is repeating the data it is receiving. However, the controller 101 may use multiple frequencies for transmitting data to overcome this limitation. If four frequencies are utilized by the controller 101, two frequencies may be used to signal a one and a zero when the controller 101 is receiving a zero from a node 105, and the other two frequencies may be used to signal a one and zero when the controller 101 is receiving a one from a node 105. This enhancement allows for collision detection, with effectively direct simplex communication between nodes 105 and full duplex communication between the controller 101 and any one node 105.

For the current transformer to operate efficiently, the frequency of the current source needs to be high enough such that the inductance of the coils is of high enough reactance to provide efficient coupling. For example, the frequency may be 20 kHz to 200 kHz. If the toroid is solid (not split), then the primary conductor is threaded through the toroid. If the toroid is instead split then the primary conductor may be inserted directly, by splitting the toroid and closing it around the conductor. Due to the air gap, a split toroid provides a higher reluctance than a solid toroid, reducing the efficiency of the transformer. This is because air has a permeability approximately 1500-3000 times lower than ferrite materials. Some ferrite materials are over 5000 times more permeable. A clamp-on design allows the toroid to temporarily open to allow for insertion of the conductor, then close again to allow for efficient energy transfer. A solid toroid is preferred for permanently installed devices, as they provide the lowest reluctance magnetic circuit and are impervious to contaminants that might otherwise build up in the gap. For solid toroids, the devices may be installed before wiring, as the cable must be threaded. A split toroid may be used for temporary connection of devices or upgrades to existing wiring. A spring-loaded clamp may be more convenient to install or remove but might not minimize the gap in the toroid. Additional mechanical pressure from bolts or hinges may reduce this gap even further and may be used for semi-permanent or permanent upgrades, while still avoiding the need to thread the cable through the toroid. Both approaches provide for the wireless transfer of power from the primary conductor to the secondary of the current transformer, as no direct electrical connection is required.

The bus functions as a hybrid wired and wireless system. Power is transmitted across distances using wires, but is delivered to devices wirelessly, i.e., without physical electrical/conductive contact. Because the device may be connected anywhere along the wire, not just at specific locations, the system provides much more flexibility than coupling to a primary multi-turn coil, that may only be in one place at one time. While ferrite cores do have losses due to hysteresis and eddy currents, they provide for much more efficiency than the air gap used by charging pads. Also, non-conductive toroids made from ceramics provide both high permeability and minimum losses due to eddy currents. Alternatively, cores may be laminated to interrupt the path of eddy currents and minimize the associated losses.

Cores may also be used where both conductors of the main loop 103 are part of the primary winding instead of just one. This may be built using two current transformers, or a single core. An example is an E-core, where each half of the core is in the shape of an E, each primary loop conductor passes through the E on either side of the center member, and the secondary is wound around the center member. This provides for increased inductance, as magnetic flux from both conductors is coupled to the secondary winding. It also provides for more balance in the wire pair. Because each wire radiates, primarily magnetically due to the relatively high current and relatively low frequency, the spacing between the conductors should be minimized in order to provide for maximum cancellation. If only one conductor passes through the current transformer, that conductor's flux will be contained over the length of the core. Because of this, it is unable to cancel the magnetic flux due to current flow in the other conductor over this length. Such an effect is minor, but a core that couples both conductors contains the flux from both conductors over this length, minimizing radiation. Magnetic radiation is a function of both current and frequency. Lower currents produce lower radiation, and lower frequencies generally lower the regulatory limits. The band from 3 kHz to 8 kHz is unregulated in many jurisdictions, so choosing a fundamental frequency in this range limits compliance concerns to emissions from harmonics, that are often significantly attenuated with respect to the fundamental. The increased inductance of this type of core provides for operation at lower frequencies, such as the frequencies of this unregulated band. Besides E-cores, other styles are available such as RM, PQ, planar, etc., and operate similarly. These core types may then be used with a wire pair such as zip-cord, commonly used as lamp cord or speaking wiring, as they are easy to separate for installation around the center of the transformer core. This type of cable may also be looped such that it adds additional turns, by looping each wire on itself and folding the loops over the center of the core. This technique allow for an odd number of turns ratio, with one turn for running the cable straight through, three turns with an additional loop of each wire, five turns for two loops on each wire, etc. The secondary winding may be constructed with traditional wire or via printed circuit board (PCB) traces. PBC traces avoid the labor required to wind the secondary and allow for the possibility of a variable number of turns on the secondary, due to the ability to conveniently connect the PCB traces via PCB mount electronic switches, such as transistors, solid state relays, or mechanical relays. The core types may also be used with separated individual conductors such as with wire rope, but the conductors may run adjacent to one another to minimize loop inductance and the associated electromagnetic emissions.

One advantage of using a current transformer and its generally low turns ratio on the primary is the ability to use high permeability materials typically used for signal rather than power applications. High permeability materials are able to support a comparatively high magnetic flux density for a given magnetic field intensity. However, because ferromagnetic materials are limited in their magnetic flux density capacity, saturation occurs at high flux densities. Because of this, high permeability materials will enter saturation at comparatively lower magnetic field intensities and this limits their current carrying capacity such that they are unsuitable for power applications unless their size is increased to decrease the flux density. However, because magnetic field intensity increases with the number of conductor turns, a current transformer operates at a lower magnetic field intensity than a typical power transformer due to its low number of turns on the primary. And because these materials are configured for signal applications, it provides for good signal performance as well—all in a small size. A potentially suitable core may be the B65813J0000Y038 from TDK. This is an RM core geometry using ferrite material T38. The relationship between magnetic field intensity (H) and magnetic flux density (B), is typically specified by a B/H curve, that plots B as function of H. The B/H curve for the T38 material suggests a design limit of 200 mT for B may be used with minimum saturation, that translates to an H of approximately 35 A/m. This is then multiplied by the core's effective magnetic length of 44 mm and divided by the primary turns of 1, yielding a primary current of approximately 1.5 A. This core has an $A_L$ of 16 uH, so it's inductance for 1 turn is 16 uH. This inductance is sufficiently high to support operation as low as 8 kHz with minimum low-frequency attenuation. For a core with a magnetic coupling coefficient close to one, such as with ferrite cores, the maximum voltage across the primary will be the reactance of the primary inductance multiplied by the primary current, that results in a maximum secondary voltage equal to this primary voltage multiplied by the turns ratio. Because of this relationship, the maximum voltage available on the secondary is directly proportional to the primary inductance.

At 8 kHz, a 16 uH inductance has a reactance of 0.8 Ohms, so the open circuit secondary voltage (maximum) will be the primary current multiplied by 0.8 Ohms, multiplied by the turns ratio.

A way to increase the effective magnetizing impedance is to introduce to a capacitive element across the secondary, such that the capacitive element cancels the reactance due to the magnetizing inductance. The capacitive element may be introduced to any or all transformer windings but adding it to the secondary (circuit) side allows the bus to remain unmodified. The maximum cancellation will occur at resonance, though substantial improvements in power transfer may occur at frequencies close to resonance. The tolerance of both the magnetizing inductance and the introduced capacitance will vary from component to component, and will change with other factors such as temperature, so achieving resonance may require either adjusting the carrier frequency or adjusting the component values. However, as the power load increases, the resistance across the capacitor changes, that decreases quality factor (Q) and reduces the sensitivity to frequency. Further, the use of transformer resonance allows for efficient power transfer even with as little as one turn on both the primary and secondary. For inductively coupling power from an external power source to the bus, it may be useful to use a 1:1 turns ratio to avoid requiring high voltages on the circuit (non-bus) side of the transformer. Due to the convenience of using a small number of turns on the bus side, this also requires a small number of turns on the circuit side, and the use of transformer resonance increases this efficiency.

In order to communicate data with each node 105, the A/C power signal may be treated as a carrier wave and modulated. The controller 101 may communicate data with each node 105 by modulating the carrier, and each node 105 may communicate data to the controller 101 or to another one or more nodes 105 by either modulating the carrier of the controller 101, injecting its own modulated carrier at a different frequency than the controller's carrier, or both. Various modulation techniques may include amplitude shift keying (ASK), frequency shift keying (FSK), phase shift keying (PSK) and others. Different modulation methods have different implementation complexities and associated costs. A cost-effective choice for data transmission from the controller 101 is FSK modulation of a square carrier wave, since square waves are both inexpensive and power-efficient to generate at different frequencies by the controller 101, and inexpensive to demodulate by the nodes 105. A cost-effective choice of modulation for the nodes 105 is ASK. This may be implemented inexpensively by modulating the load across the secondary of the transformer, that modulates the current amplitude in both the secondary and primary of the current transformer. This current may then be converted to a voltage in the controller 101, demodulated using either a coherent demodulator, an envelope detector, or in software using digital signal processing techniques. Alternatively, the node 105 may couple its own carrier or multiple carriers on the line, operating at different frequencies, similar to analog modem technologies. This may allow for much more bandwidth than ASK, at increased cost and complexity.

The controller 101 may also be configured to interface to multiple cables, either by having a separate full driver interface for each cable, that may support simultaneous communication with each loop 103, or by using multiplexing techniques to switch between cables as a way of minimizing costs. Power may be provided by batteries, solar-assisted or solar-charged batteries, or direct wiring. Further consideration to galvanic corrosion must be given when using a non-copper primary cable, such as aluminum or steel. This is because the wiring on the controller's printed circuit board assembly may be copper, so a transition from copper to a different metal is required. When electrical current flows through dissimilar metals in the presence of an electrolyte such as water, corrosion will occur. To prevent this, the transition between metals should be environmentally sealed and ideally should occur inside the controller's electrical enclosure and be encapsulated.

Figure 3:
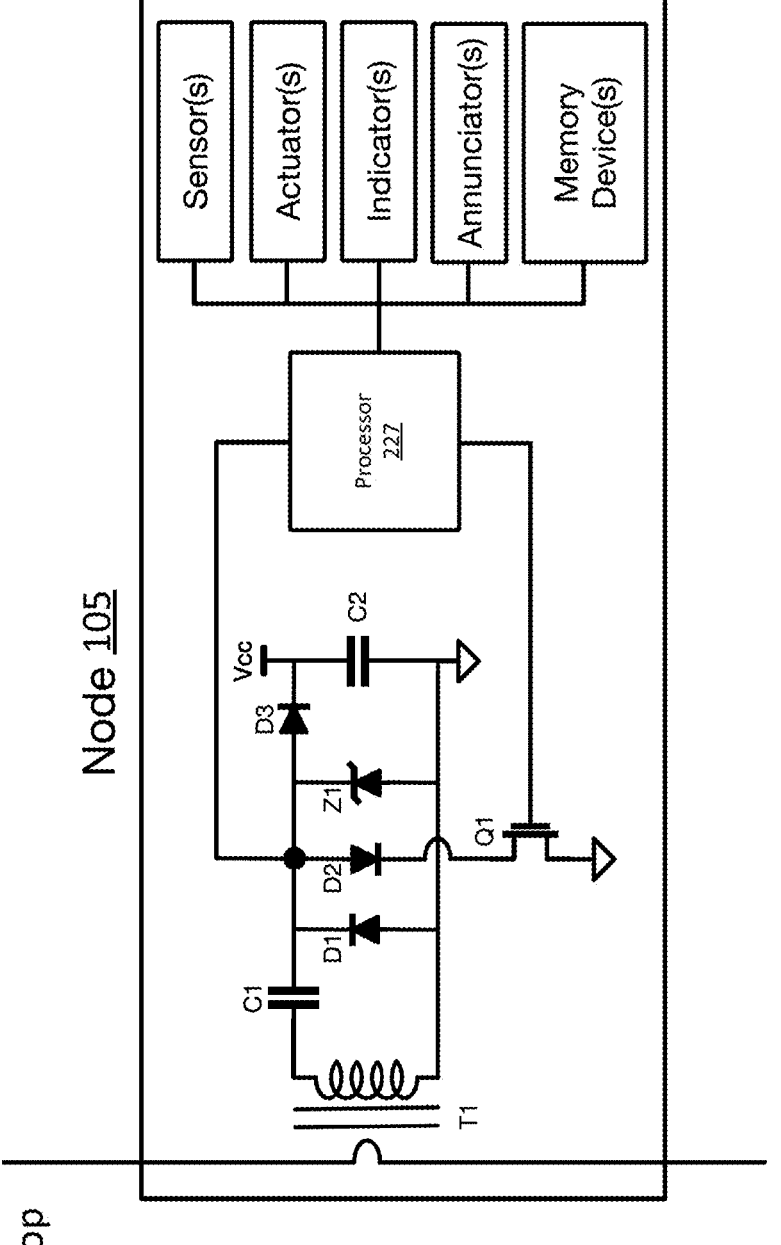
FIG. 3 depicts an example node of FIG. 1 according to an embodiment.

FIG. 3 depicts an example of an implementation of a node 105 according to an embodiment. The node 105 in FIG. 3 includes an embedded current transformer T1, a processor 227 and various modules including for example, a sensor, an actuator, an indicator, an annunciator, and a memory. The node 105 may be, for example, a sensor device that is configured to acquire sensor data and transmit the sensor data to the controller 101 for analysis.

T1 is an embedded current transformer that the primary cable threads through. The carrier signal in the primary and thus secondary is typically a square wave. C1 and D1 function as a voltage clamp to DC-shift the carrier signal by the amplitude so that the voltage does not drop below ground by more than the D1 diode drop. D2 and Q1 function to modulate the current in the secondary winding, that modulates the current in the primary winding for the purpose of transmitting data from the node 105. D3 and C2 function as a peak detector, that stabilizes the supply voltage with C2 holding the voltage when the input voltage drops below the voltage across C2. Z1 is a Zener diode used for regulating the voltage and shunting excess current. Because the node 105 is powered by a current source, the voltage will increase to the Zener breakdown voltage. By placing the Zener diode between the voltage clamp and peak detector, rather than after the peak detector, it avoids depleting the charge on C2 but still serves to shunt excess current. The voltage clamp and peak detector together form a voltage doubler, and these may be cascaded to create higher order voltage multipliers. The processor measures the frequency of the voltage feeding the peak detector for the purpose of receiving data sent from the head-end controller 101. It also controls Q1 in order to modulate the load for the purpose of sending data to the head-end controller. Additionally, the processor will typically be connected to other devices, such as analog or digital sensors, actuators, indicators, annunciators, memory devices, etc.

The modulation may occur on either the negative or the positive phase of the cycle, depending on the physical orientation of the node 105, that affects the direction that the current travels through the transformer. Because of this, the demodulation signal may occur during either the positive or negative phase of the carrier based on the orientation. In general, unless the nodes 105 use different modulation frequencies, they must transmit at different times to avoid collisions, though it may be possible for two devices to modulate each phase concurrently since only one phase is used by each device. Whether or not each phase is used concurrently, the receiver demodulating this signal must be able to demodulate either phase.

Figure 4:
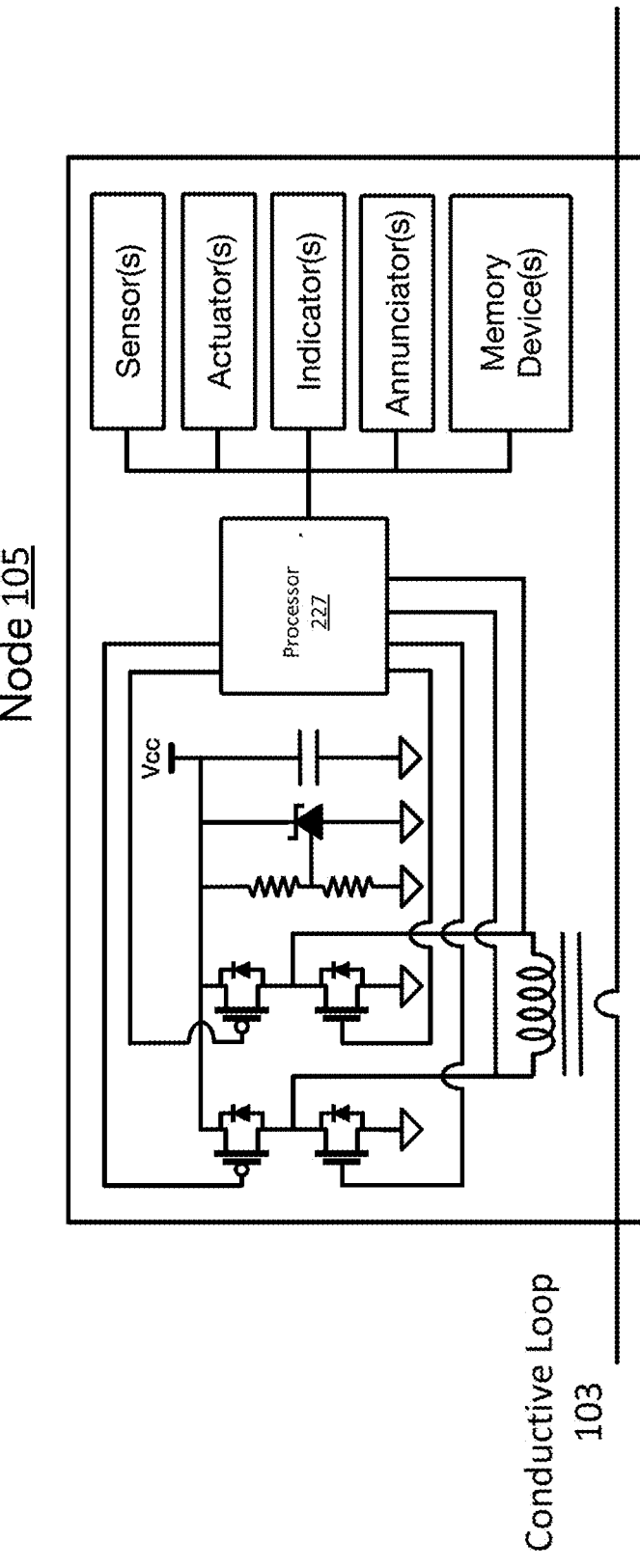
FIG. 4 depicts another example node of FIG. 1 according to an embodiment.

FIG. 4 depicts an alternative circuit for a node 105 that utilizes a H-bridge MOSFET transistor arrangement as an active full-bridge rectifier. The body diode of the MOSFET allows it to function as a basic diode-based full bridge rectifier, and the diode drops may be eliminated by activating and deactivating each MOSFETs at the appropriate times. Additionally, it allows for modulation on both phases, by either activating both low-side MOSFETs or both high-side MOSFETS, and eliminates the diode drop during modulation. This elimination of the diode drop also allows for a more optimal secondary bypass. A shunt-mode voltage regulator, such as the TL431, may also be use in place of the Zener diode, in order to more precisely regulate the voltage supply. This type of regulator also transitions to a high-impedance at a more predictable voltage than a Zener diode, preventing it from discharging the output capacitor when the transformer secondary is bypassed via the H-bridge. The processor 227 may also monitor the secondary voltage as a way to determine when each MOSFET should be activated, and an integrated or separate voltage comparator may be used to monitor the secondary while bypassed, as a small voltage will still be developed across the secondary in this state. To simplify detection, additional resistance may be added in series with the secondary winding in order to increase the bypass voltage. This increases the voltage drop across the primary accordingly, where the primary voltage is equal to the secondary voltage divided by the turns ratio. Because of this, higher turns ratios on the secondary simplifies detection during secondary bypass, but also requires higher currents on the primary due to the increased step down of current. The use of PCB traces on the secondary provides the option of using a higher turns ratio during bypass mode compared to powering mode.

Another topology may be used to support high speed communications. By using a conductor pair with controlled geometry, the characteristic impedance may be known and treated as a transmission line. Typical lamp cord, for example, has a characteristic impedance of roughly 100 Ohms. With enough frequency band separation between the main power frequency and the data transmission frequencies, the data devices may introduce different termination impedances without interfering with the power frequency. Devices may be coupled to the transmission line either on the ends, or somewhere between. At the ends, a device it may communicate from one side, and may terminate the transmission line with a matching impedance to minimize reflections. Between the ends, any termination impedance will present as an impedance in series with each conductor. This results in effectively separate spans of transmission line, connected together by a series impedance. By using small impedances, it minimizes the impedance mismatch, but results in very small received signals. However, this signal may be extracted using low pass filter to remove the A/C power signal, and then a low noise amplifier may be used to process the received data. If each device is able to adjust the value of this termination impedance dynamically, a single device may be configured to support different functions. A matching resistor may end terminate the lines, a small resistor may be used to avoid disrupting the line, and an open circuit or high impedance may be used to effectively separate the line segments for the purpose of discovering the position of the device on the line, using techniques such as time domain reflectometry (TDR). By having electronic control over this resistance, all of these different operating modes may be supported. This topology allows for voltage-based data communications at high frequencies, with current-based power transmission at low frequencies.

Figure 5:
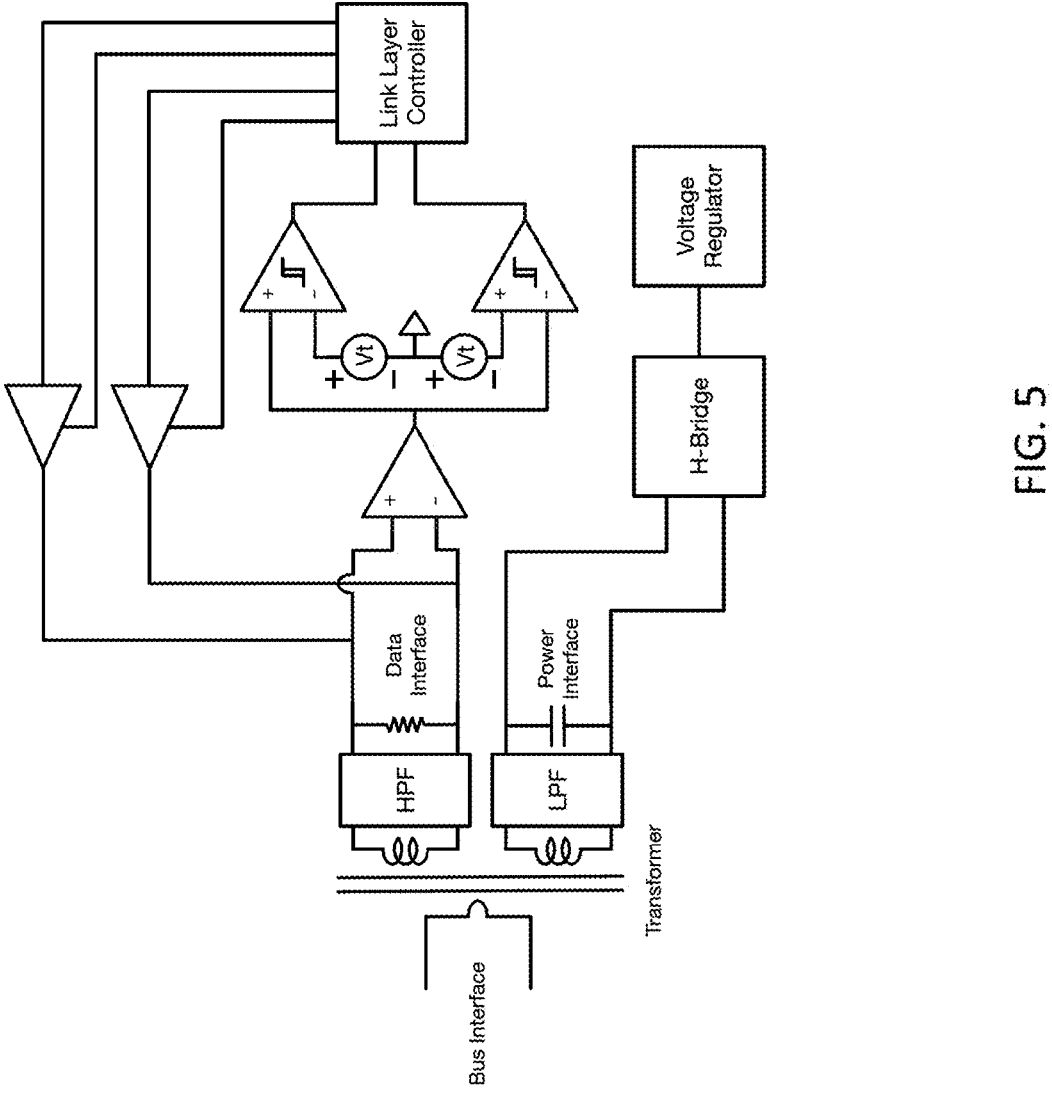
FIG. 5 depicts an example of a two-interface system according to an embodiment.
Figure 6:
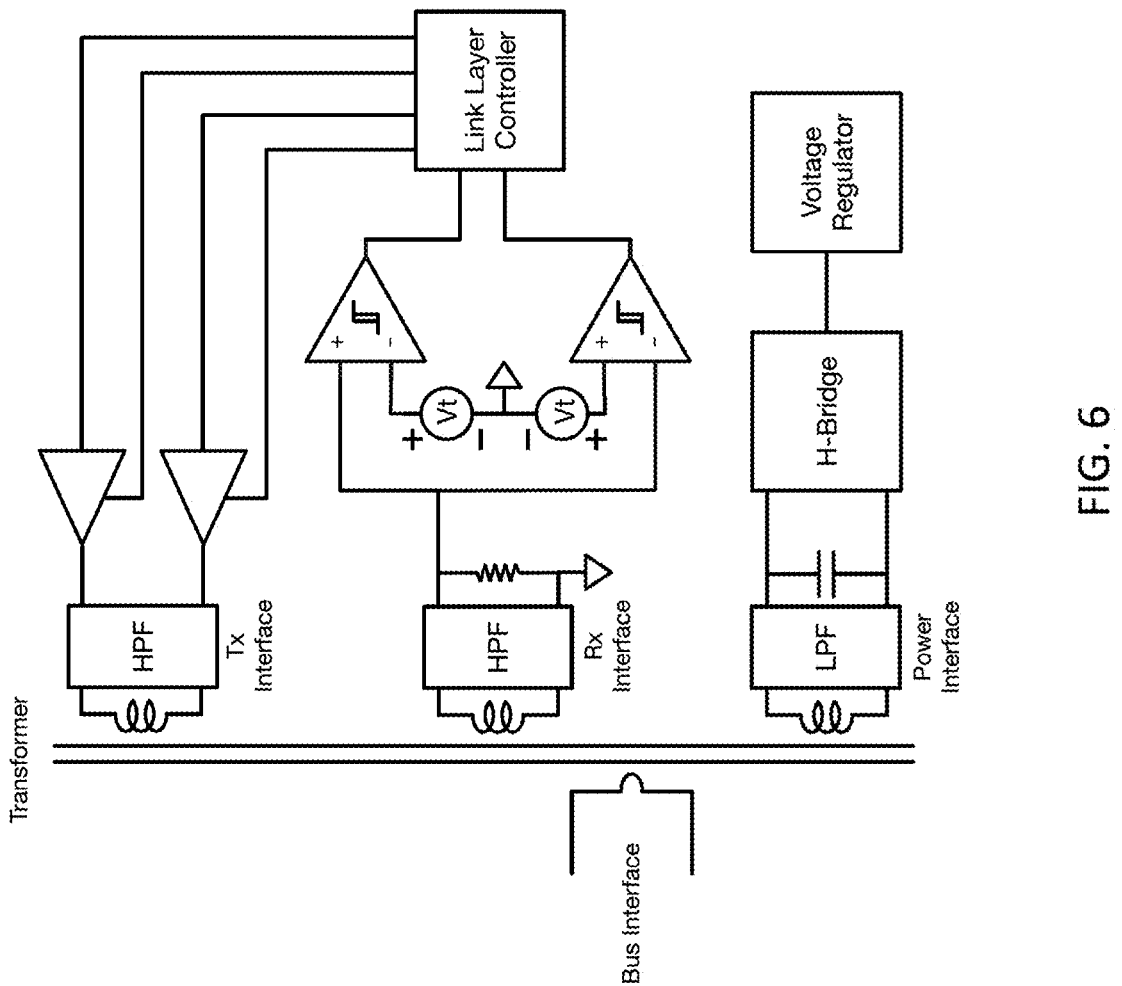
FIG. 6 depicts an example of a three-interface system according to an embodiment.

FIGS. 5 AND 6 illustrate two different line interfaces according to an embodiment. FIG. 5 depicts two secondary windings and FIG. 6 depicts three. Different types of line interfaces may be utilized that include, but are not limited to, power injection, power reception, data transmission, data reception, or combinations thereof. The primary power injection interface, when using a low turns ratio and resonance, may not support both data and power due to the capacitance across the circuit-side winding functioning as a short-circuit to high frequency. A choke, or inductor may be utilized to avoid loading the data signal, but this may not be practical at a small number of turns, as the required inductance may be larger than the magnetizing inductance itself. This type of interface is referred to as a power injector. The same limitation may apply to a power reception interface with a low turns ratio and resonance, that is referred to as a power sink. A dedicated data interface does not require the use of resonance, but rather needs to block or shunt the power signal. A hybrid interface both injects or receives power and transmits or receives data signals. This may be performed on a single winding, or separate windings. A shared winding has the advantage of transformer simplicity at the expense of needing more complex circuitry and a separate winding introduces further transformer complexity with the benefit of simplified circuitry. When PCB traces are used for windings, it may allow for additional windings for very little cost.

With a shared communications bus, a mechanism may be implemented to detect whether more than one transmitter is transmitting concurrently. Unless the transmitters are using orthogonal signaling, such as by using different frequency bands or quadrature modulation so that the data is separable, concurrent transmission may cause data corruption without mitigating strategies. Concurrent transmission resulting in data corruptions is referred to a collision, and both collision avoidance and collision detection are desirable features of a communications bus. Collision avoidance may be implemented by waiting until no data is being received before transmitting. However, two or more transmitters may all begin transmitting concurrently, attempting to avoid collision but still causing a collision. In this case the collision should be detected and, if destructive, retransmissions should be attempted. Collisions may be difficult to detect, however, when the received signals are much smaller than the transmitted ones as may be the case in the disclosed inductive communications bus. This is because the received signal will be dominated by the transmitted one, preventing the successful detection of another concurrently transmitted signal. Subtracting the transmitted signal, either through analog circuitry and/or via digital signal processing techniques is one method to remove the transmitted signal, but the amount of rejection attainable is a function of electronic component tolerances and/or analog to digital (ADC) resolution. Another method to avoid this complexity is to use a physical layer protocol that leaves the communications bus deenergized during certain bit states. As this effectively turns the transmitter off, it allows the receiver to detect data transmitted by other devices during these bit states. Controller Area Network (CAN), an industrial communications bus standard, uses the concept of a dominant bit vs. a recessive bit to facilitate non-destructive collision detection. Because a logical 0 is actively driven by the transmitter, and a logical 1 is passively driven through a resistor, a collision may be detected by receiving a 0 when transmitting a 1. In this scheme, a collision is only detected by those devices not driving the dominant bit; the devices transmitting the dominant bit will receive the same bit and therefore will not detect the collision. The protocol therefore requires that a device detecting a collision cease transmission, until only one transmitter remains, unaware that any collision occurred and leaving the message intact. This technique also avoids direct bus contention, where one transmitter drives a 1 while another drives a 0, that may result in large currents and potential damage to driver circuitry. However, it limits the speed of the bus, as recessive bits are not able to achieve as rapid of an edge rate as a dominant bit, due to the higher impedance. Further, this approach is not compatible with the inductive coupling utilized in the embodiments, as it must be A/C coupled. However, a different approach may be taken to achieve similar ends by the use of specific line coding techniques. One such technique is to use a modified version of on-off keying (OOK), by using an actively driven symbol for a certain logical state, say a positive voltage followed by a negative voltage, and a weakly driven constant zero voltage for the inverse logical state. This provides DC balance and allows for the reception of driven data during the weakly driven zero voltage state. To avoid the speed limitation associated the slow rise/fall times caused by weakly driving the line to the constant voltage state, a further enhancement is to actively drive it to zero momentarily, then tri-state the driver. This retains the speed advantages of an actively driven but, with the collision detection advantages of leaving the bus regularly de-energized. Because each device is electrically in series, the signals are additive. Therefore, whether a 0 V signal is actively driven or passively, the 0 V does not interfere with a non-zero transmitter (adds 0 V), other than slightly changing the overall series impedance.

Different line coding schemes may or may not feature an embedded clock signal. Schemes such as Manchester encoding embed a clock signal at the expense of extra bandwidth consumption. At high data rates, low jitter clock recovery becomes important for minimizing the bit error rate, but at lower rates it is less important as there is a longer bit time. This allows for increased jitter tolerance, so software-based clock recovery may be feasible. An improved version of alternate mark inversion may be well suited to voltage-based transmission on an inductive bus. This format sends a zero-valued signal for one binary state, and alternating polarity non-zero-valued signals for the alternate state, preserving for DC balance. For example, 0 V may be sent for a logical 0, and 1 V for a logical 1, where the 1 V alternates between +1 V and −1 V for each subsequent one, whether contiguous or not. An improvement to this technique involves temporarily driving a logical 0 to 0 V when the current state is a logical 1 (non-zero voltage), then ceasing drive to allow for collision detection in the case of the of a logical 1 transmitted by another device while still supporting high speed due to the active drive phase. The duration of this driving to a 0 V state should be the minimum time required to establish the bus as 0 V at the device's interface and may be sensed with the receiver. This may be accomplished with a driver able to operate in four states, including positive (+), negative (−), zero (0) and open (Z). An h-bridge or dual tri-state buffer is able to support these four states, as it may drive positive or negative voltages, short both outputs high or low to drive to 0 V, or leave the outputs disconnected. As an example, the bitstream 10110001 may be encoded as +0Z−+0Z0Z0Z−. The duration of + and − are each the full bit period, as is the sum of the duration of 0 and Z. As both the 0 and Z states result in a zero voltage on the line, the receiver only need to detect the +, − and the 0 V states. This may be accomplished with multiple voltage comparators with or without hysteresis. An example may be to use two comparators: one with a positive threshold and another with a negative threshold. Either comparator output being active may indicate a logical 1 and both being inactive may indicate a logical 0, though this logic may be inverted. Generally, these two thresholds may be the same, but may differ. The threshold may or may not be adjustable, either together or independently, through the use of a digital to analog converter (DAC) or digital potentiometer. An adjustable reference allows the bit error rate to be minimized based on the received signal amplitude, that may be a function of the impedance at the receiver. This impedance may also be adjustable, with specific impedances for matching to the transmission line for data reception, or for effectively open circuiting the transmission line. The magnetizing inductance provides an upper limit to what this impedance may be, so an electrically connected terminator that allows the power carrier to pass with low impedance while still providing a matching impedance to the data signal may be required at the end of the wire pair. As the ends of industry standard wire pairs are already open circuited and require some connection to one another to allow significant current to flow, an electrically connected terminator is able to provide both termination and current carrying functions.

In order to support the specific timing requirements of this line coding technique due to the temporary driven 0 V state, a higher frequency clock than the data rate is needed. As the timeslot available is equal to 1/clock rate. For example, if a clock at eight times the data rate was used, this may support driving the bus to 0 V for an integer multiple of ⅛ the bit time. This specialized logic sequencing may be performed by a microcontroller or microprocessor of sufficient speed, dedicated sequential and combinational logic, or by a programmable logic device such as a field programmable gate array (FPGA) or complex programmable device (CPLD). An FPGA provides higher logic density than a CPLD and may be utilized as a dedicated controller to transmit and received data, while providing a simple buffered interface to a microcontroller or microprocessor, that relaxes the timing constraints of the microcontroller or microprocessor. These functions may be considered data link layer, or layer two in the Open Systems Interconnection (OSI) model, and this link layer controller may perform further functions, such as but not limited to collision detection, packet integrity validation and retransmission, and packet disassembly and reassembly.

The voltage drop seen across the primary of a node 105 is proportional to the power dissipated in the node 105, assuming the primary current is held constant. This limits the number of devices that may be operating on a single loop 103 based on the maximum voltage supported by the controller 101. However, if the secondary is short-circuited, the power consumption is minimized and the phase and amplitude of the current flow in the secondary will be such that it induces a roughly equal and opposite flux in the toroid, minimizing the inductance of the primary and minimizing the voltage drop. When the node 105 keeps Q1 activated, it shunts the secondary through a capacitor and diode during both phases, that reduces the inductive load but still allows for the measurement of the carrier frequency due to the voltage drop across the diodes. The processor may therefore be monitoring the frequency while operating off the charge stored on C2. Once the charge is depleted, the processor may temporarily cease activating Q1 to recharge C2. This technique allows the bus to support a greater number of devices, provided that each device has its own dedicated recharge timeslots, or they use a dedicated global recharge timeslot where any device may recharge at the same time during which data communication is suspended. A reserved global recharge signal may be distributed by the controller 101, that directs all devices to recharge. This might be a particular command, a reserved frequency, or any other method of sending such a signal. Alternatively, the timeslot might be randomly chosen by the devices such that they rarely overlap. An ill-timed recharge might interfere with data communications, so error checking mechanisms such as cyclical redundancy checks (CRCs) may be used to confirm the data and trigger retransmission when required.

Different standardized device types may be provided, such as switches, relays, temperature and other environmental sensors, lights, etc. that are compatible with the system. With a wide variety of standard devices available, the system may sense and control a wide variety of devices on a single loop 103 of wire. The wire may be copper for more controlled environments, or steel for harsh environments. The wire may thread through current transformers for permanently installed devices or clamp on for removable ones. This may be an alternative to, or used to supplement, traditional residential and commercial wiring, where at minimum two wires are run in parallel and electrically connect to devices. Instead, the system operates multiple devices on a single loop 103 of wire, where each device inductively couples to the wire via a current transformer. With this design, no bare wiring is ever exposed, so it is safe and waterproof. Devices simply clamp onto the wire for power and access to the control bus. They draw power when needed or otherwise stay asleep by shunting across their secondary. Because the disclosed system provides data communications as well as power, switches may control any device by programming the behavior rather than requiring dedicated wiring. Any device may connect to the power grid at effectively any voltage they wish by using the disclosed voltage doubler and rectifier with a nonlinear device such as a Zener diode, to regulate to the desired voltage. Further, devices that adapt to standard electrical plugs may provide compatibility with appliances configured for standard plugs. For high power designs, the controller 101 may need to generate higher voltages as the load increases. The two-stage chopper design is well adapted to generate a wide range of voltages at high efficiency in order to maintain a regulated current. This current may be adjusted to adapt to the power demands of the network and reduce it when possible to minimize power consumption.

Figure 7:
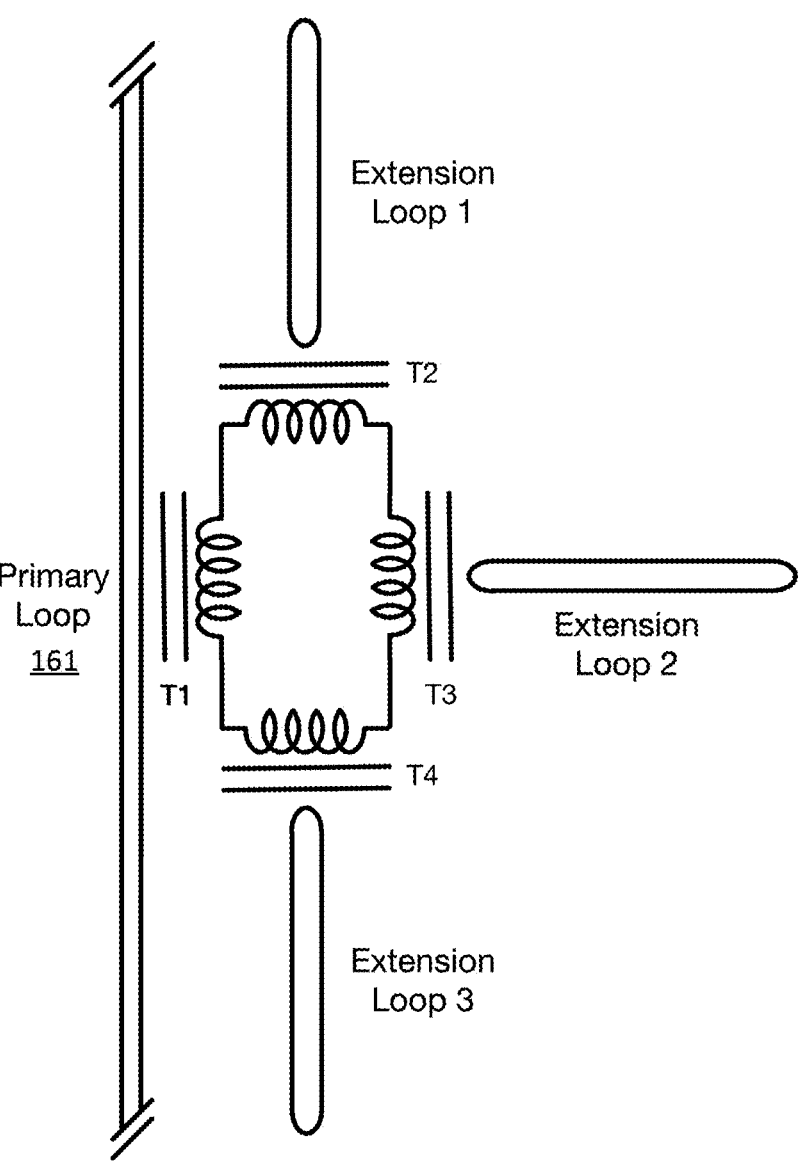
FIG. 7 depicts an example of a system for extension loops according to an embodiment.
Figure 8:
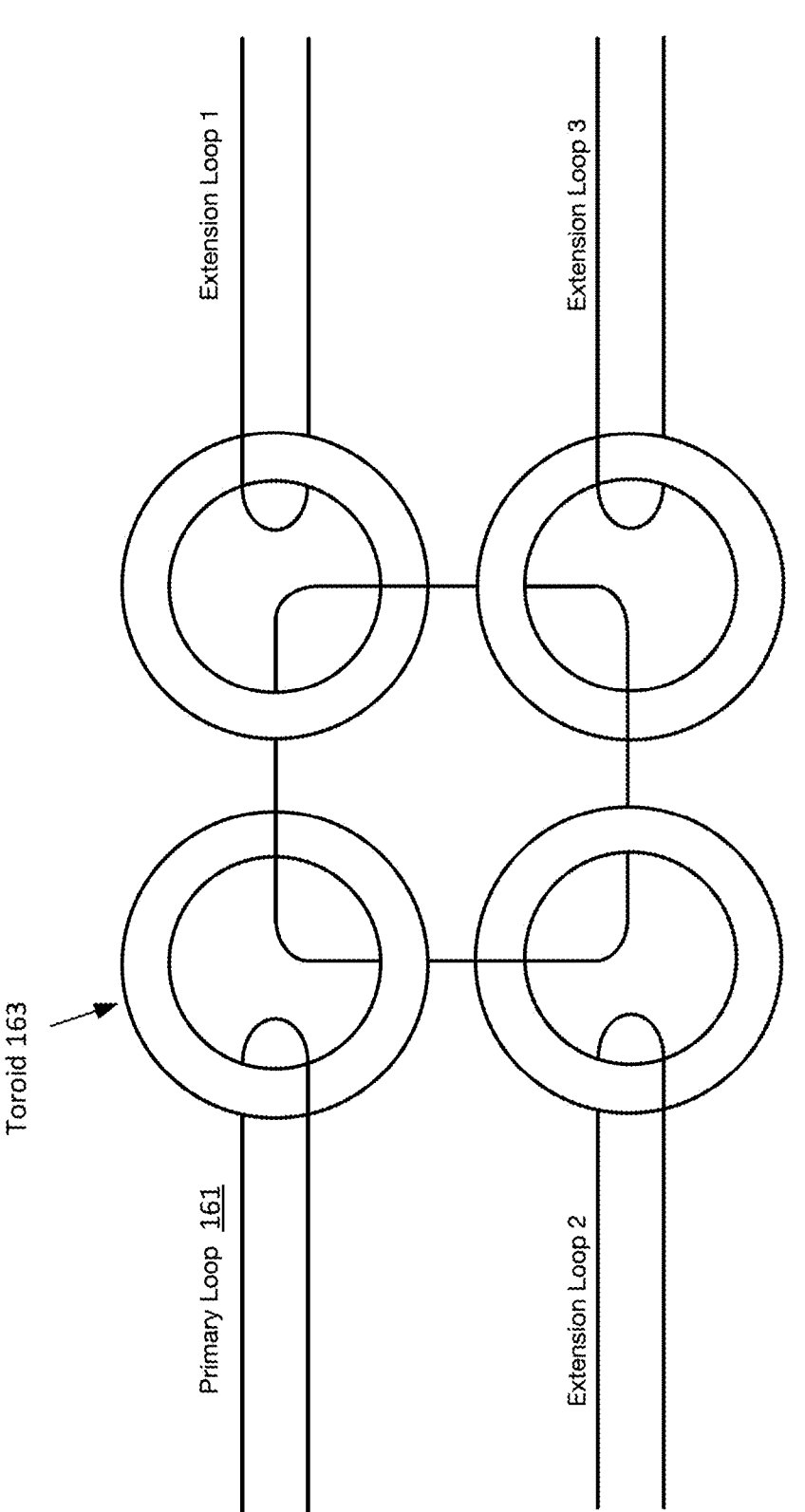
FIG. 8 depicts another example of a system for extension loops according to an embodiment.

Passive splitters, as shown FIGS. 7 and 8, may provide for branching current loops from the main circuits. FIG. 7 depicts a schematic-based representation of this splitter. FIG. 7 includes a primary loop 161 and three Extension loops. FIG. 8 depicts a possible construction method for a primary loop 161 and extension loops using four toroids 163 and conductors. By using two or more current transformers where the secondaries are wired in series, this creates the equivalent of an A/C current mirror, as the current in any of the primaries will be the same as the current in any other primary, provided that the voltage on the secondary cannot rise uncontrolled. A multi-port version of this devices may have the current injected into any port be replicated on the other ports. This provides for a seamless expansion from the main loops. A two-port device, including two current transformers where the secondaries are connected together, will cause the current in both primaries to be the same, assuming the turns ratio of each current transformer is the same. If the ratios are different, the current may be stepped up or down as desired. A leg may be attached to the bus simply by clamping one port on the primary loop 103 and clamping the other port on the extension loop.

For coupling two loops as shown in FIG. 9A, a single ferromagnetic toroid 163 with two single turn loops also provides this function, either split or solid. Devices may be clamped onto the extension loop and have access to power and data communications. Additional loops may be clamped onto a single toroid 163, as shown in FIG. 9B, and the current injected on one wire will be equal to the total current of the other wires. In this arrangement, it functions as a current divider excited by a current source. This means an increase in current load on one wire will cause a reduction in the current to the other wires, rather than having all currents equal as in the other multi-port device. Multiple loads in parallel rather than series with a current source is analogous to multiple voltage loads in series rather than in parallel. The current drawn by a device will subtract from the current available from any other device in the same way that the voltage drop across any single device causes the voltage across other series devices to drop. This is why parallel wiring is generally used for voltage-based wiring, and series wiring is generally used for current-based systems. However, a single toroid is a very cost-effective way to connect multiple loops together; every loop 103 simply loops through the toroid. This may require coordination of the nodes 105 to ensure none draw more than their portion of the current unless there's excess current on the line. Note that current transformers should not have open-circuit ports, or the voltage may reach high levels, unless the current has another path. Therefore, unused primary ports may have a closed conductive loop 103 thread through them to allow the current to circulate. A device similar to a carabiner may be suitable to provide this function. Alternatively, a shunting device across the secondary winding may be utilized as an alternative current path.

As an alternative to the disclosed passive splitters, an active bridging device may be used. This device functions similarly to an Ethernet switch or bridge, extending the possible range of the network. Such bridging devices may embed both controller 101 and node 105 functionality into a single device. The controller functionality may serve to energize and coordinate communications on one or more buses, and the node functionality may allow a node 105 to connect to one or more busses energized and coordinated by other controllers 101. This allows the signals to be generated in both directions, avoiding the signal loss that accompanies passive splitters. The bridge may require external power or consume power from the bus in the same manner as any other node 105.

With the disclosed system, aluminum is a viable choice for commercial and residential wiring. Aluminum has 61% of the conductivity of copper, but 30% of the weight, and so an aluminum wire has roughly half the weight and 30% greater diameter than a copper wire of the same length and resistance. Because copper is roughly three times more expensive than aluminum per unit weight, aluminum wiring may be six times more cost effective than copper wiring. Due to the attractive economics, aluminum is used for power transmission and was also used for residential wiring in the 1960s and mid-1970s when copper prices were very high. However, many issues resulted due to aluminum corrosion and differences in the coefficient of thermal expansion and contraction between the aluminum wiring and other metals to which it was electrically connected, such as copper-based switches and electrical outlets. This resulted in failures in wiring and even fires. However, the disclosed system avoids these issues as the aluminum does not need to be electrically connect to the powered devices. Because it's a current loop 103, it may remain electrically insulated from all devices since they couple inductively rather than electrically. Because the physical size of transformers is inversely proportional to the switching frequency, it is desirable to operate at higher frequencies than the standard 50-60 Hz used in residential and commercial wiring. However, as the frequency increases the skin effect causes current to become confined to a thin shell, resulting in higher losses and heat dissipation in the wiring. This effect is reduced when using lower frequencies but requires the use of larger or multiple toroids in order to efficiently couple between circuits. A cylindrical ferromagnetic shell may provide for effective coupling at lower frequencies, as it provides more length along the wire for coupling, and overall higher mutual inductance. It may be possible to use both a low and high frequency current transformers simultaneously, as the low frequency transformer may have reduced high frequency support and the high frequency transformer may have reduced low frequency support. The power transmission current transformer may involve larger geometries and the data transmission current transformer may have smaller geometries to afford more bandwidth.

To support higher frequencies, stranded wire reduces the skin effect as current may not easily flow radially and is constrained primarily axially. Litz wire is a specialized form of stranded enamel wire, where each strand is less than one skin depth and each strand is electrically insulated, constraining the current to only axial flow. Additionally, other weaving and twisting patterns are used to minimize the losses due to using high frequencies. Solderable litz wire uses solderable enamel; otherwise, the enable must be removed from the end in order to ensure electrical connection to each strand. The use of litz wire, or use of multiple conductors of stranded wire, may be used as a way to reduce these A/C losses, at increased expense, size, and weight. Besides lowering the frequency, another way to ameliorate this effect is to use a lower current, as the losses are proportional to the square of current. This will result in increased voltage on the bus in comparison to what may be required for higher currents. Reducing the current by a factor of two and increasing the voltage by a factor of two will reduce the wiring losses by a factor of four.

Besides the skin effect, higher frequencies, e.g., greater than 1 MHz, may create new challenges, such as electromagnetic interference (EMI) and transmission line effects. A frequency in the tens or hundreds of kHz avoids the transmission line effects, assuming edge rates are limited. Also, keeping the loop 103 area minimized also reduces radiation. Further, the loop 103 may be shielded to reduce radiation. In order to tap into the loop 103, the shield needs to be removed, and the two wires spread apart so that the current transformer may wrap around one of the conductors in the case of a toroid, or around both in the case of an E-core. This causes a small increase in inductance at this location but may be wrapped by foil or some other conductive enclosure as a means to minimize radiation from this tap point. Alternatively, and in addition to shielding techniques, spread-spectrum technologies may be used to minimize radiated energy at any one frequency. This includes but is not limited to frequency hopped spread spectrum (FHSS), where the carrier frequencies rapidly change from frequency to frequency in a pseudo-random pattern. Other spread spectrum techniques include amplitude modulation where the modulation utilizes a pseudo-random bit sequence (PRBS) using devices such as linear-feedback shift registers, spreading the frequency spectrum around the carrier. Because the disclosed system uses FSK for transmission from the controller 101 to the nodes 105, FHSS is a reasonable choice. Particular pseudo-random hop patterns may be mapped to specific data payloads, at the expense of reduced data bandwidth. And because the nodes 105 use ASK for transmission back to the controller 101, use of a PRBS by the nodes 105 is feasible, also at reduced data bandwidth. However, if the carrier is already using FHSS, direct ASK of that carrier may be sufficient as the carrier is already spread spectrum.

The described system may also be used for any application where it may be desirable to run a simple wire rope for coupling to sensors or actuators, or other devices, distributed across a machine, vehicle, a building, though the ground, or a liquid. One such application is for monitoring the temperature, moisture and other characteristics of grain stored in grain bins. Existing cable systems use standard copper wire with temperature sensors soldered to the copper wire. Because of the large mechanical stresses in a grain bin, wire rope is used to further support the cable and prevent damage. A way of reducing the cost and increasing the flexibility of such system is to use the wire rope itself to power and communicate with the sensors. With the disclosed system, a wire rope may simply be suspended from the roof of the bin, where it threads through one or more nodes 105 configured to measure the desired grain characteristics at specific locations; these nodes 105 may be spaced at the farmer's choosing, but six feet between sensors is typically used. The cable may then be looped back up to the roof and strapped to the other half of the cable along the length. This minimizes the area of the inductive loop 103, that maximizes the performance of the system. The bottom of the loop 103 may be secured to the bottom of the bin and the top may be terminated to a controller 101 that is responsible for communicating with the nodes 105 to retrieve the grain characteristics, store this information in its memory, and forward it, via a communications interface, e.g., a wired and/or wireless communications network, to other systems so that farmers may monitor the status of their grain. To minimize the amount of installation required on the roof of the bin, the cables and controller 101 may be coupled together at the bottom, using one of the disclosed passive couplers, and the controller 101 may remain closer to the ground. This may allow each cable to be simply suspended to the roof with a hook. Note that a hook is preferred to a continuous loop, as a ferromagnetic continuous loop may function as an inductive load to the sensor cable loop. A hook doesn't provide the same amount of inductance, as it introduces an air gap into the magnetic path. An alternative non-inductive solution utilizing the wire rope for communications may be to run a number of separate steel cables arranged as a traditional communications and power bus and provide for electrical connection between the devices and the bus. The devices may clamp onto the cables and cut through the insulation using insulation displacement techniques. This provides similar strength and modularity benefits to the inductive technique and may also reduce the costs of connectors, but much less significantly as compared with the inductive technique. Additionally, it allows for more power transmission and potentially more bandwidth but at increased node 105 cost and labor, with more points of failure due to the risk of the connection between the device and wire ropes failing due to corrosion or mechanical wear. This type of solution may not be waterproof unless efforts are made to seal the required electrical connections.

For grain bin monitoring, each node 105 may contain one or more of temperature, moisture, gas, or other sensors for monitoring the condition of grain and/or surrounding environment. The temperature sensor may be embedded in the node 105, where heat is conducted through the enclosure or encapsulant, or may be thermally coupled to a better thermal conductor such as copper or another metal, where the thermal conductor makes contact with the grain. The moisture sensor may be a humidity sensor that is exposed to the air, or a capacitive sensor where electrodes on the node's circuit board are arranged to be sensitive to measuring changes in capacitance due to the surrounding grain's dielectric. A low-cost capacitive sensor may be developed with printed circuit board traces, where the capacitance between the traces is determined by measuring charge transfer between electrodes, using a specialized capacitance-to-digital converter, a relaxation oscillator where changes in capacitance cause a change in frequency, or measuring charge/discharge times. This approach has an advantage over a humidity sensor as the electrodes may remain encapsulated and the solution may be waterproof. The use of capacitance as a means for measuring grain moisture is well-understood, and the grain's relative permittivity is a function of moisture content, temperature, and compaction. The temperature is directly monitored, but compaction is a function of the pressure of the grain, that is a function of the weight of grain pushing on the node 105. By having a network of nodes 105 at different depths, the compaction, and therefore pressure, may be modelled as a function of depth based on the commodity, and the weight of grain that has been deposited in the bin, that may be obtained using an external scale system such as a stationary truck scale, on-board truck scale or on-board grain cart scale.

If multiple nodes 105 distributed throughout the bin collect capacitance and temperature data and this is recorded with timestamps, the changes in capacitance due to pressure increases may be separated from capacitance changes due to moisture changes. This is because the changes in capacitance due to changes in pressure from bin fills will increase much more rapidly than changes in capacitance due to changes in actual moisture. When the bin is empty, the nodes 105 will all read a minimum baseline capacitance value. As the grain level rises and then covers the node 105, the capacitance will increase due to the grain entering the electric field between the two electrodes. After the grain fills most of the electric field, the rate of increase in capacitance will slow. Further increases will be due to increased pressure from grain further piling above, and the capacitance before this effect is driven primarily by the temperature and moisture of the grain. Therefore, a baseline moisture reading may be made at this point, before compaction occurs, by making a capacitance and temperature measurement. Increases in capacitance due to compaction may be separated from the moisture measurement, as they change relatively quickly, due to originating from truck loads rather than moisture changes, that are inherently slow. The slow changes between the faster changes in capacitance represent the actual moisture changes. This separation allows for both an estimate of the grain pressure and the moisture level of the bin. The overall model accuracy may be further improved by combining the data from each sensor, as the grain passes by one node 105 then later by a node 105 above it. Once a node 105 is covered in grain, the capacitance will increase with increased pressure from the grain above. As the weight of grain increases, the grain becomes compacted as the kernels reorient to minimize the space. This causes the capacitance to increase relatively quickly with pressure. After the kernels have finished reorienting, they will no longer be able to move, and the rate of capacitance increase with increased pressure decreases. At high pressure, this rate is further decreased to a minimum rate, and the relationship becomes linear. This behavior may then be characterized and used as an estimate of the pressure, and therefore weight, of the grain above the sensor. If the spacing of sensors is also predetermined, an estimate for grain height above the sensor may be determined. By using the grain height estimate above a node 105 at the time the node 105 above it becomes covered in grain, one may automatically calibrate the estimate. Once the next node 105 above it is covered in grain, a new reference point is established as the height of grain above the previous node 105 is now known. The system may use the distance between sensors to build a model for estimating grain height above the newly covered node 105 based on that node's increase in measured capacitance. This process may be repeated for set of nodes 105 on a single line, and for all lines within a single bin. Besides the moisture and temperature data, this technique provides estimates for grain height and weight.

Another application for the bin monitoring cable is for monitoring the condition of grain in a grain bag or silage in a silage bag. Placing the cable in the grain is an option as the design is very mechanically robust, but a specialized insertion and extraction mechanism may be required to allow for the typical bag filling and extraction process to operate normally. By placing the cable on the ground below the bag, the bag filling and extraction processes remains unaffected. The temperature at the bottom of the bag relative to ambient temperature is an indication of the condition of the grain, and the capacitance may be used to measure the moisture. If the sensor were embedded in the grain, either in a bag or in a bin, it may be completely surrounded by grain. In the case of installing the sensor under a grain bag, half the sensor may be effectively surrounded by grain and the other half effectively surrounded by the ground, and this geometry may be characterized to provide accurate moisture measurements.

A second class of application for this technology is for communicating with devices installed on a machine, stationary or movable, with a conductive frame such as steel or aluminum. The wire rope may be threaded through each node 105, kept near the frame whenever possible to minimize loop inductance, and electrically bonded to the frame at the end of the wire rope; the controller 101 may also be bonded to the frame to complete the circuit. Alternatively, the cable may loop back alongside itself and terminate to the controller 101, keeping the loop area minimized. This provides for a simple, very robust, cabling system. An example of this application may be machine with load cells installed for onboard weighing. On machines such as a grain cart, feed mixer or seed tender, the cables are a common point of failure due to mechanical stresses or damage due to rodents or other pests. Load cell signals are very small, so they are particularly sensitive to water intrusion or changes in resistance, making them especially sensitive to damage. Additionally, load cells are typically wired in parallel in a junction box so they are weighed aggregately not individually. Because of this, a single load cell failure cannot be isolated. By instead coupling a node 105 from the disclosed system directly to each individual load cell, where the node 105 is able to make load cell measurements, visibility is provided to each load cell, making fault isolation much simpler. The node 105 may connect to the load cell with a very short cable with a sealed connector or may be embedded directly inside the load cell. Then a single length of wire rope may be threaded through each node 105 eliminating traditional cabling and replacing it with much more mechanically robust wire rope. Also, the disclosed multiport passive coupler device, where multiple secondaries are connected in series, may function as the equivalent of a junction box, where each load cell may connect to a dedicated loop 103 and another loop 103 may connect back to the main electronics. Unused ports should be treated as previously disclosed, by inserting a conductive loop through them. A single current transformer, built from a single toroid with multiple loops may also be used, but each load cell may potentially draw all current, interrupting the functioning of the other load cells. Careful coordination between nodes 105 may be required if using a single toroid, as previously disclosed.

A third class of application is for underground monitoring or control. With this topology, a single wire rope may be run underground and threaded through multiple nodes 105 for the purpose of measuring parameter of soil, such as temperature and moisture or other conditions, or down a hole such as an oil or gas well. The cable may be bonded to earth at far end, and the controller 101 bonded to earth to complete the circuit. Alternatively, the cable may be looped back on itself.

A fourth class of application is for fluid monitoring or control. With this topology, a single wire rope may be run underwater and threaded through multiple nodes 105 for the purpose of measuring liquid level or other characteristics of the fluid. For conductive fluids, such as sea water, the far end of the cable may be in electrical contact with the fluid and the controller 101 bonded to the same fluid to complete the circuit. Alternatively, the cable may be looped back on itself.

A fifth class of application is for an agricultural sprayer or applicator nozzle control along one or more booms. A sprayer supporting control of the flow rate for each nozzle requires the ability to power a linear array of solenoid valves, where each valve controls the flow for a particular nozzle. Because the power is typically fed from the end of the boom, the current is at a maximum where it is fed from, as it must support the total current demand for all solenoids along the boom. However, this current decreases along the length of the boom, as the number of downstream solenoids decreases. This causes the wire gauge to be oversized for much of the boom, unless individual sections of the cable use different gauges, which increases complexity and connector requirements. Further, connectors are required for each solenoid, significantly increasing cost. By utilizing the inductive current loop, the optimal current may be used along the entire length of the boom, allowing the wire gauge to be optimally sized, and each solenoid is inductively coupled, avoiding connectors. Rather than the current decreasing along the length of the boom, the voltage decreases instead, avoiding underutilized wire capacity. The controller then increases the voltage as the number of solenoid valves increases, in order to maintain the desired loop current. The result is a much more cost-efficient solution, both due to reduced wire gauges as well as reduced connectors. The lack of galvanic connection required by the inductive loop allows for aluminum wiring as discussed previously, further reducing costs. And because the inductive loop supports data communications as well, control of the solenoid activation and duty cycle may be supported on the same loop used for power transmission.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A system for providing power and bidirectional communication, the system comprising:
   a conductive loop comprising a wire rope;
   one or more nodes configured to inductively couple with the conductive loop to receive power therefrom and conduct bidirectional communications thereover, wherein a coupling is possible at any unoccupied position along the conductive loop by passing the wire rope through a current transformer of a respective node; and
   a controller configured to inject alternating current into the conductive loop that is inductively coupled to each node, where the alternating current is received and converted to a working voltage by each respective node of the one or more nodes, the controller further configured to communicate data through the conductive loop with the one or more nodes, wherein the controller is configured to communicate data with each node by modulating a controller carrier, and each node of the one or more nodes may communicate data concurrently to the controller and to another node of the one or more nodes by modulating the controller carrier, injecting a modulated node carrier at a different frequency than the controller carrier, or modulating the controller carrier and injecting its own modulated node carrier.

2. The system of claim 1, wherein the current transformer clamps on the wire rope of the conductive loop, wherein a clamped node is configured to be removable from the conductive loop by unclamping the current transformer.

3. The system of claim 1, wherein the current transformer is configured in an E-core, wherein the wire rope of the conductive loop passes through both sides of a center member of the E-core, and a secondary loop of the current transformer is wound around the center member.

4. The system of claim 1, wherein the one or more nodes are configured to convert the alternating current to the working voltage through rectification.

5. The system of claim 1, wherein the conductive loop is environmentally sealed.

6. The system of claim 1, wherein the controller is configured to generate a square wave carrier at various voltages and frequencies and measure a current in the conductive loop in order to regulate the current to a particular current and to demodulate signals transmitted from the nodes.

7. The system of claim 1, wherein the controller is configured to modulate the controller carrier using FSK modulation.

8. The system of claim 1, wherein the modulated node carrier comprises ASK modulation.

9. The system of claim 1, wherein the controller is configured to poll each, or a subset, of the one or more nodes by energizing the conductive loop and polling a respective node at a particular rate, wherein after polling of each or the subset of the one or more nodes, the controller is configured to stop energizing the conductive loop to minimize power consumption.

10. The system of claim 1, wherein each node of the one or more nodes comprises at least a respective current transformer, a processor, a memory, and a sensor.

11. The system of claim 10, wherein the sensor comprises one or more of a temperature, a moisture, or a gas sensor configured for monitoring a condition of grain, a surrounding environment, or the condition of grain and the surrounding environment.

12. The system of claim 1, further comprising:
   a secondary conductive loop coupled to the conductive loop with a ferromagnetic toroid, the secondary conductive loop configured to provide power and bidirectional communications to nodes connected thereto.

13. A system for providing power and bidirectional communication, the system comprising:
   a primary loop configured to provide power and bidirectional communications, the primary loop comprising a wire rope;
   an extension loop configured to provide power and bidirectional communications;
   a ferromagnetic toroid configured to couple the primary loop and the extension loop;
   a plurality of nodes each coupled to either the primary loop or the extension loop by a current transformer embedded in each respective node; and
   a controller coupled to the primary loop and configured to communicate with and provide power to each of the plurality of nodes though the primary loop or the primary loop and the extension loop, wherein the controller is configured to communicate data with each node by modulating a controller carrier, and each node of the plurality of nodes may communicate data concurrently to the controller and to another node of the plurality of nodes by modulating the controller carrier, injecting a modulated node carrier at a different frequency than the controller carrier, or modulating the controller carrier and injecting its own modulated node carrier.

14. The system of claim 13, wherein the plurality of nodes each comprise one or more sensor devices.

15. The system of claim 1, wherein the current transformer comprises a solid toroid with a hole, wherein the wire rope is passed through the hole.

16. The system of claim 1, wherein the current transformer comprises a split toroid, wherein passing the wire rope of the conductive loop through the current transformer comprises splitting the split toroid and closing the split toroid around the wire rope.

\* \* \* \* \*